(12) United States Patent
Hobson et al.

(10) Patent No.: US 11,679,856 B2
(45) Date of Patent: Jun. 20, 2023

(54) AIRSHIP WITH VACUUM BASED LIFT METHODOLOGY

(71) Applicants: Kathleen M. Hobson, Cary, NC (US);
Robert W. Hobson, Cary, NC (US)

(72) Inventors: Kathleen M. Hobson, Cary, NC (US);
Robert W. Hobson, Cary, NC (US)

(73) Assignee: Overallsky, Inc., Cary, NC (US)

( * ) Notice: Subject to any disclaimer, the term of this patent is extended or adjusted under 35 U.S.C. 154(b) by 0 days.

(21) Appl. No.: 16/845,200

(22) Filed: Apr. 10, 2020

(65) Prior Publication Data

US 2020/0346729 A1 Nov. 5, 2020

Related U.S. Application Data

(60) Provisional application No. 62/833,906, filed on Apr. 15, 2019.

(51) Int. Cl.
| | |
|---|---|
| *B64B 1/06* | (2006.01) |
| *B64B 1/08* | (2006.01) |
| *B64B 1/24* | (2006.01) |
| *B64B 1/30* | (2006.01) |
| *B64B 1/00* | (2006.01) |
| *B64B 1/14* | (2006.01) |

(52) U.S. Cl.
CPC ............... *B64B 1/06* (2013.01); *B64B 1/005* (2013.01); *B64B 1/08* (2013.01); *B64B 1/14* (2013.01); *B64B 1/24* (2013.01); *B64B 1/30* (2013.01)

(58) Field of Classification Search
CPC .. B64B 1/06; B64B 1/005; B64B 1/08; B64B 1/14; B64B 1/24; B64B 1/30
See application file for complete search history.

(56) References Cited

U.S. PATENT DOCUMENTS

| | | | | |
|---|---|---|---|---|
| 7,261,255 | B2 * | 8/2007 | Li | B64B 1/58 244/30 |
| 8,833,696 | B1 * | 9/2014 | Teller | B64B 1/70 244/125 |
| 9,828,081 | B1 * | 11/2017 | DeVaul | B64B 1/44 |
| 11,066,145 | B1 * | 7/2021 | Brutoco | B64B 1/08 |
| 2006/0038062 | A1 * | 2/2006 | Akhmeteli | B64B 1/06 244/30 |
| 2017/0021907 | A1 * | 1/2017 | Rapport | B64B 1/14 |
| 2018/0233617 | A1 * | 8/2018 | Colosimo | H01L 31/0521 |
| 2019/0039710 | A1 * | 2/2019 | Babitskiy | B64B 1/64 |

* cited by examiner

*Primary Examiner* — Tye William Abell
(74) *Attorney, Agent, or Firm* — Richard L. Bigelow

(57) ABSTRACT

An airship utilizing an innovative lift mechanism featuring dynamic and static vacuum chambers. The lift created by the vacuums created in the chambers elevates the ship into the atmosphere, thereby eliminating the need for lighter than air gases.

10 Claims, 8 Drawing Sheets

AIRSHIP WITH VACUUM BASED LIFT METHODOLOGY

CROSS-REFERENCE TO RELATED APPLICATIONS

This Non-Provisional Patent Application claims priority to U.S. Provisional Patent Application 62/833,906 entitled Airship with Vacuum Based Lift Methodology filed Apr. 15, 2019.

FIELD OF THE INVENTION

The present invention is directed to an airship that uses a vacuum to provide the lifting force to elevate the airship above the ground.

BACKGROUND OF THE INVENTION

Airships have been used for military and commercial applications for over a century. Virtually all airships have used some sort of lighter than air gas such as Hydrogen or Helium to provide the lifting force necessary to elevate the airship above the ground. There are problems inherent in using such lighter than air gases. Hydrogen is highly combustible as was clearly evidenced by the Hindenburg disaster. Helium is rare and expensive to produce. These facts have limited the size and overall deployment of airships.

In particular, use of lighter than air gases as the lifting mechanism for airships has prevented the development of ultra large airships that can be used to transport large amounts of cargo. The volume of lighter than air gases required to lift ultra large airships would be cost prohibitive and/or extremely dangerous depending on what type of lighter than air gas was used.

The present invention presents an alternative to using lighter than air gases in ultra large airships capable of moving large loads over great distances. In particular, the present invention discloses the use of vacuums in large chambers in an ultra large airship to provide the necessary lifting force to elevate the ultra large airship into the atmosphere. The lifting force provided by the vacuum would be sufficient to lift one or more standard shipping containers and transport them throughout the world.

In alternate embodiments of the instant invention, the vacuum lift concept can be employed in airships of a variety of sizes and shapes for a variety of commercial applications including, but not limited to, billboards, water generators, solar parks, hotels, wind farms, condominiums, homes, farms, fresh water transport, transport for material and people, and mobile rocket launch platform. It can be used for carbon harvesting and a platform for removal of fluorocarbons from the atmosphere. It can also be used as a platform for the generation of power and for the production of synthetic natural gas formed by breaking down carbon dioxide and water vapor in the atmosphere and recombining into synthetic hydrocarbon chains using solar power to drive the process. Due to the fact that the airship can remain at altitude virtually for an unlimited time it could be used as a permanent broadcasting platform, weather monitoring station or any other high altitude platform. It could act as a permanently stationed "island in the sky" that would be self-sufficient. The only real limitation is the human staff based on the station. It would be able to rise above stormy weather when necessary and would be able to reposition to anywhere in the globe. This airship system could be used as a landing vehicle on other planets in our solar system that currently have atmospheres. The vessel could be assembled in the vacuum of space and allowed to fall into the atmosphere much like a float falling into water. As the vacuum is slowly filled with the other planet atmosphere the ship would slowly lose altitude until it was down on the surface. The process could be reversed to allow the airship to rise to very high altitude above the planet surface. In addition, the vacuum airship could be configured with additional thrust so as to enable it to escape the earth's gravitational pull and venture into space.

SUMMARY OF THE INVENTION

The present invention is directed to an airship that uses a vacuum to provide the lifting force to elevate the airship above the ground. More particularly the lift is provided by a series of accordion-like airtight structures (referred to as dynamic chambers) inserted in the interior of the ultra large airship. As the accordion-like dynamic chambers are expanded using engines or motors, a vacuum space is expanded in the dynamic chambers and air is displaced, thereby producing upward lift.

Throughout this specification, the terms "tank" and "chamber", "jetstream", "jet stream", and "jetstreams", and "vessel", "airship" and "air ship" are used interchangeably.

Alternatively, rigid chambers (referred to as static chambers) could and would be used to support the base weight of the structure while the dynamic chambers would be used to lift additional payloads added to the airship. In the case of static chambers, a vacuum would be initially drawn using engines or motors to evacuate air from the chamber. The static chambers, if properly sealed, would only need to be evacuated at the initial launch of the airship. The vacuum in the static chamber would remain for the operational life of the vessel. An advantage also of using a vacuum is that all the materials internally would not be subjected to corrosion because of the absence of oxygen or other gases that the structure material could react with. If over time the static vacuum chamber were to have small leaks the dynamic chamber could be piped to the static chamber and the leaked gasses in the static chamber could be evacuated. Then the gasses in the dynamic chamber could be expelled to the atmosphere by reducing (or collapsing) the dynamic chamber. Once the dynamic chamber was fully collapsed the valve to the atmosphere would be closed and the dynamic chamber could be expanded creating a vacuum in that chamber again. This would be the method to keep the airship aloft without having to go back down to the surface. No gases would have to be replenished or added provided the airship had exposure to sunlight to generate electricity to power the winches and motors on the airship.

A 600 ft×600 ft×600 ft dynamic chamber could produce lift sufficient to lift approximately 683 twenty-foot equivalent unit (TEU) of mass where twenty foot refers to a standard twenty-foot container. The theory of operation would be that the dynamic chambers are expanded to achieve vacuum volumes sufficient to lift the ultra large airship into a jet stream. By riding one or more of the world's jetstreams, the ultra large airship could travel around the world in a few days and not have to use fuel to push along the route. There would be a need to have fans that would be used to control the direction of the airship and perhaps to hold it stationary in the air. These fans would be sized for the airship and most likely be powered by electric motors. The primary power source would be a combination of solar panels and batteries for nighttime operation. The large surface area of the airship would be ideal for mounting solar panels and with proper sizing of the static tank there would be very little limitation to the number of batteries that could be included in the airship.

DESCRIPTION OF THE PRIOR ART

There are many examples of airships in the prior art. Virtually all the airships disclosed in the prior art incorporate the use of lighter than air gases such as Helium or Hydrogen as the lifting mechanism. The present invention dispenses with the use of lighter than air gases as the lift mechanism and instead uses the concept of sustainable vacuums to provide the lift needed.

BRIEF DESCRIPTION OF THE DRAWINGS

Further aspects of the instant invention will be more readily appreciated upon review of the detailed description of the preferred embodiments included below when taken in conjunction with the accompanying drawings, of which.

DETAILED DESCRIPTION OF THE INVENTION

According to various embodiments of the present invention, a vacuum based ultra large airship and method for using such an airship is disclosed. Key elements of the invention are disclosed in the following paragraphs.

The airship is designed to lift large quantities of mass using a vacuum instead of gas. The airship will be comprised of a mother ship, lift modules, static chambers, dynamic chambers, stabilization trim chambers, control platform, payload deck, roof covered in solar panels, dynamic equipment deck, support structure based on vertical columns to transfer the forces from payload to the lifting tanks and a control and living quarters. There are landing skids to support the structure when all the lift has been eliminated by removal of the vacuum and there are also bumpers and fenders around all six sides to facilitate docking in air with other airships. In general, the mother ship is the large framework into which one or more lift modules can embed or detach.

Figure 1:
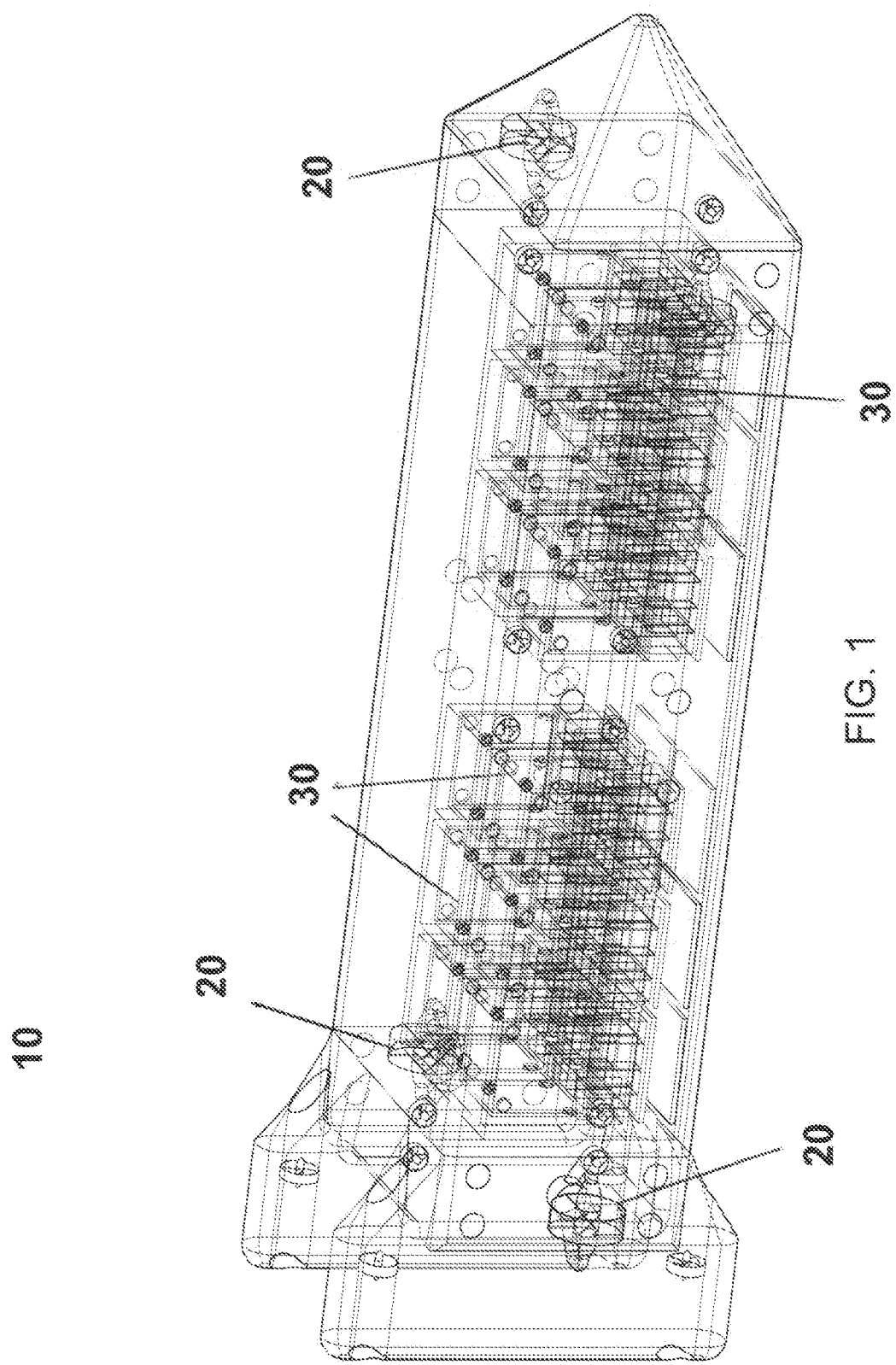
FIG. 1 is a perspective view of the ultra large airship showing positioning of the dynamic and/or static chambers within the airframe.

Referring to FIG. 1, a fully loaded vacuum airship 10 is shown. This view shows the various lift modules 30 (in the case of FIG. 1, there are 12 such modules) embedded into the framework of the vacuum airship (also known as the Mother ship). The airship can move by elevating itself using vacuums to one of the jet streams and riding a jet stream to a given region. The airship can adjust its location by exiting the jet stream and using the large thruster drive fans 20 to move into a desired location.

Figure 1A:
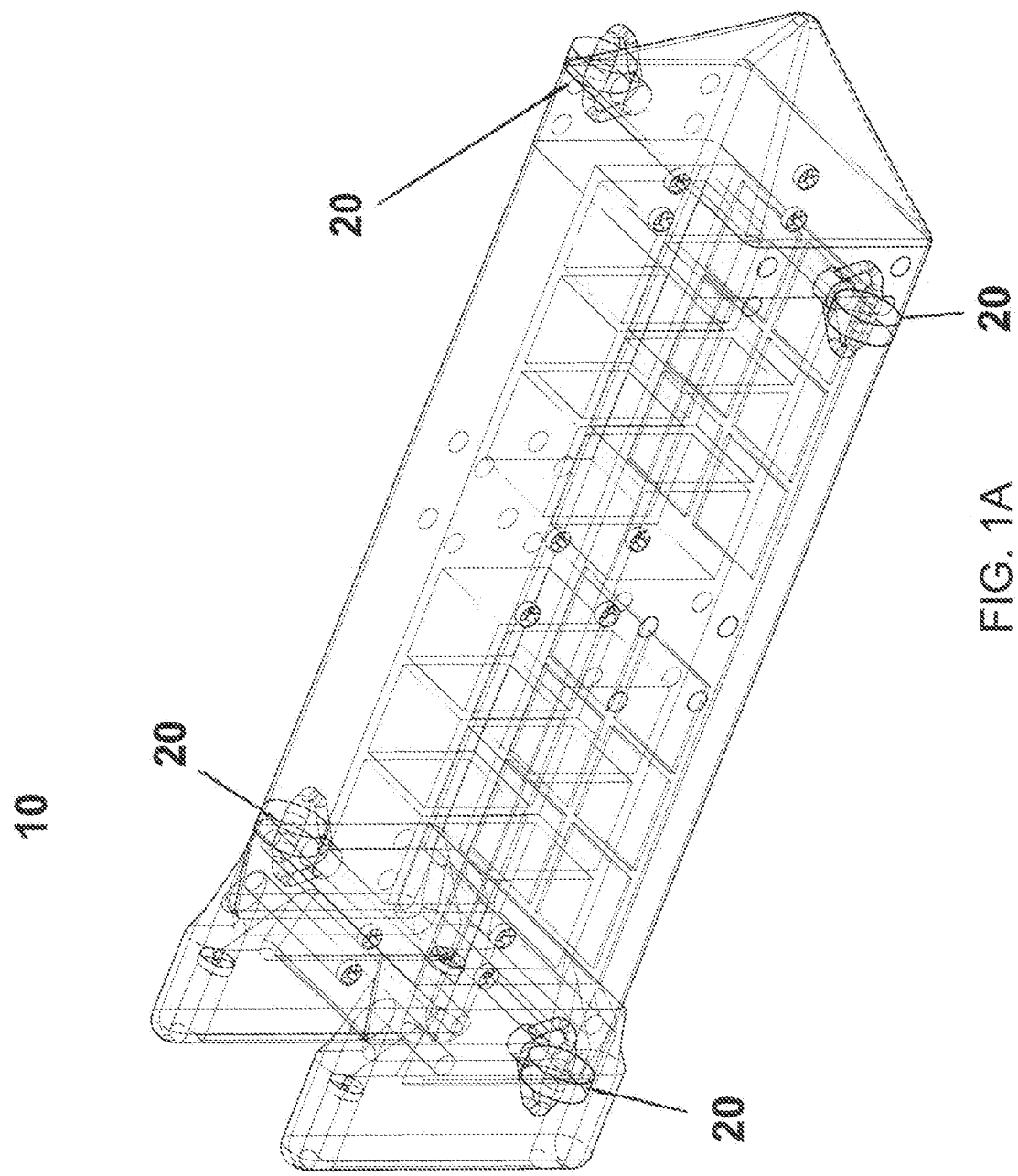
FIG. 1A is a perspective view of the structural skeleton of airship without the chambers.

FIG. 1A shows the vacuum airship 10 in an unloaded configuration without the lifting modules. Also shown are the various thruster and drive fans 20.

Figure 1B:
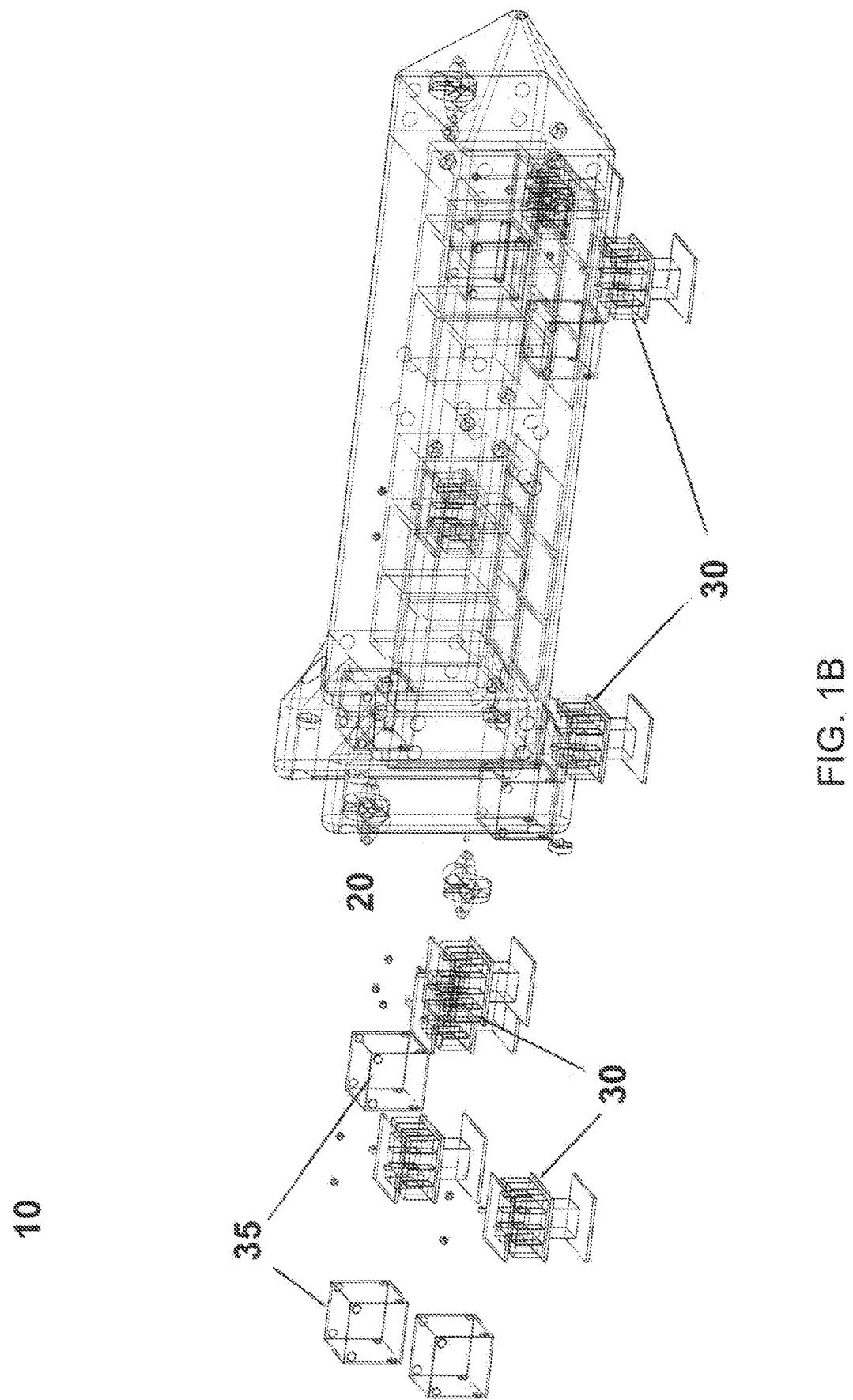
FIG. 1B is an exploded view of the airship.

FIG. 1B shows an exploded view of the airship 10 and includes the lift modules 30 and the thruster and drive fans 20. Also shown are the static chambers 35 which are part of the lift module.

Figure 2B:
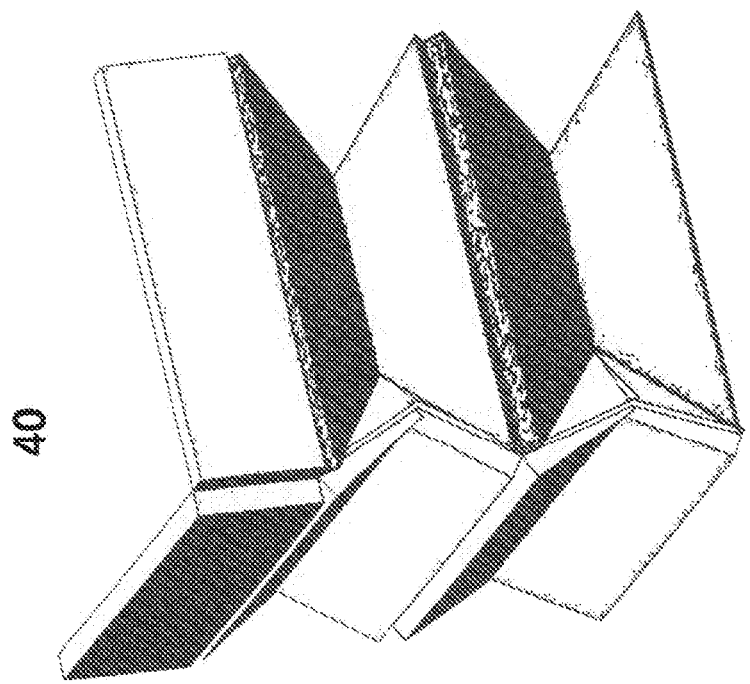
FIG. 2B is a perspective view of dynamic chamber partially extended.
Figure 2A:
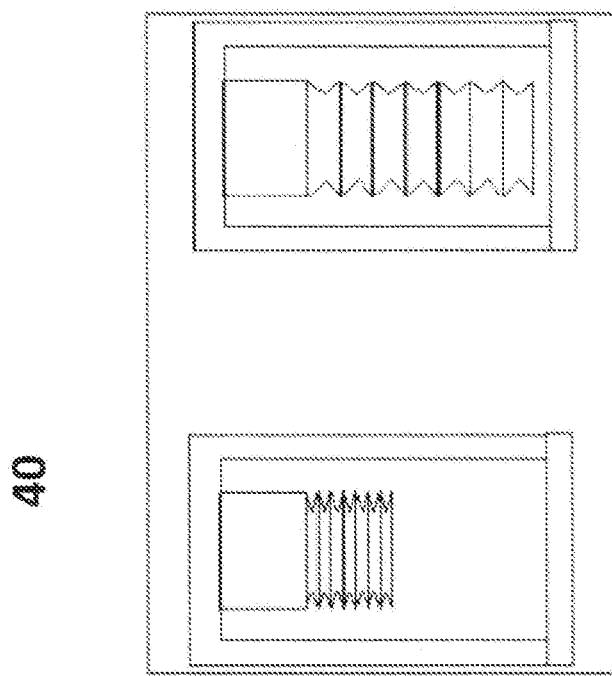
FIG. 2A is a two-part schematic view of the dynamic chamber showing the chamber in the collapsed and expanded position.

FIG. 2A is a schematic view of the dynamic chamber 40. The left side shows the dynamic chamber in the collapsed position. The right side shows the chamber as it expands, thereby creating the vacuum.

FIG. 2B shows the dynamic chamber 40 in the process of being expanded.

Figure 3:
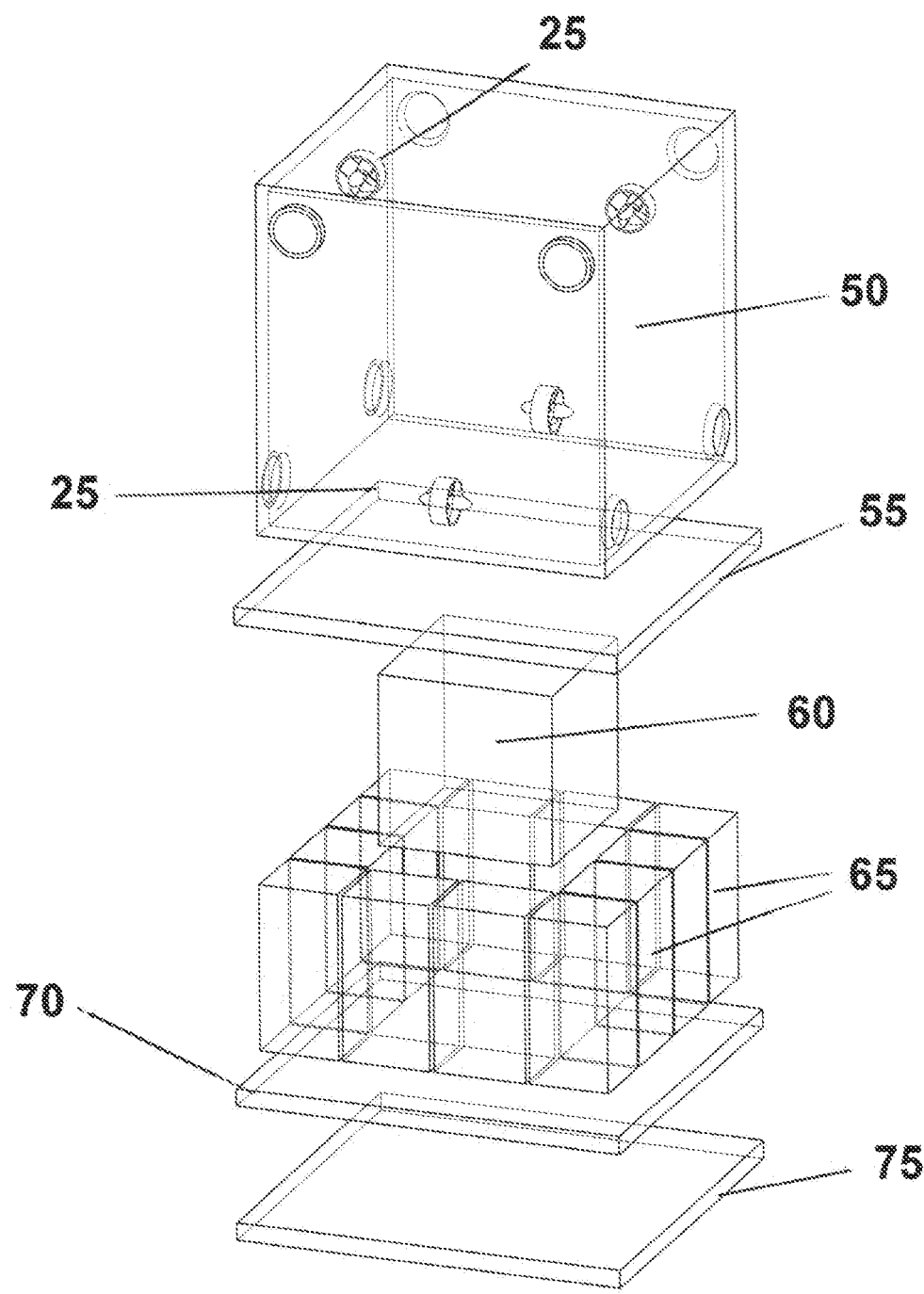
FIG. 3 is an exploded perspective view of an individual lifting module.

FIG. 3 shows an exploded view of the lift module 30. Included in this view is the static tank 50 which sits on top of the static deck 55. Below the static tank 55 is a dynamic tank 60 surround by a series of trim tanks 65. The trim tanks are used to make fine adjustments in elevation and to compensate for off center loads. The thruster fans 25 that serve to move and position the life module are also shown. The equipment deck 70 is the platform on which the dynamic tank 60, various trim tanks 65 and associated machinery rest. Finally, the payload deck 75 is mechanically attached (not shown) to the equipment deck.

Figure 4:
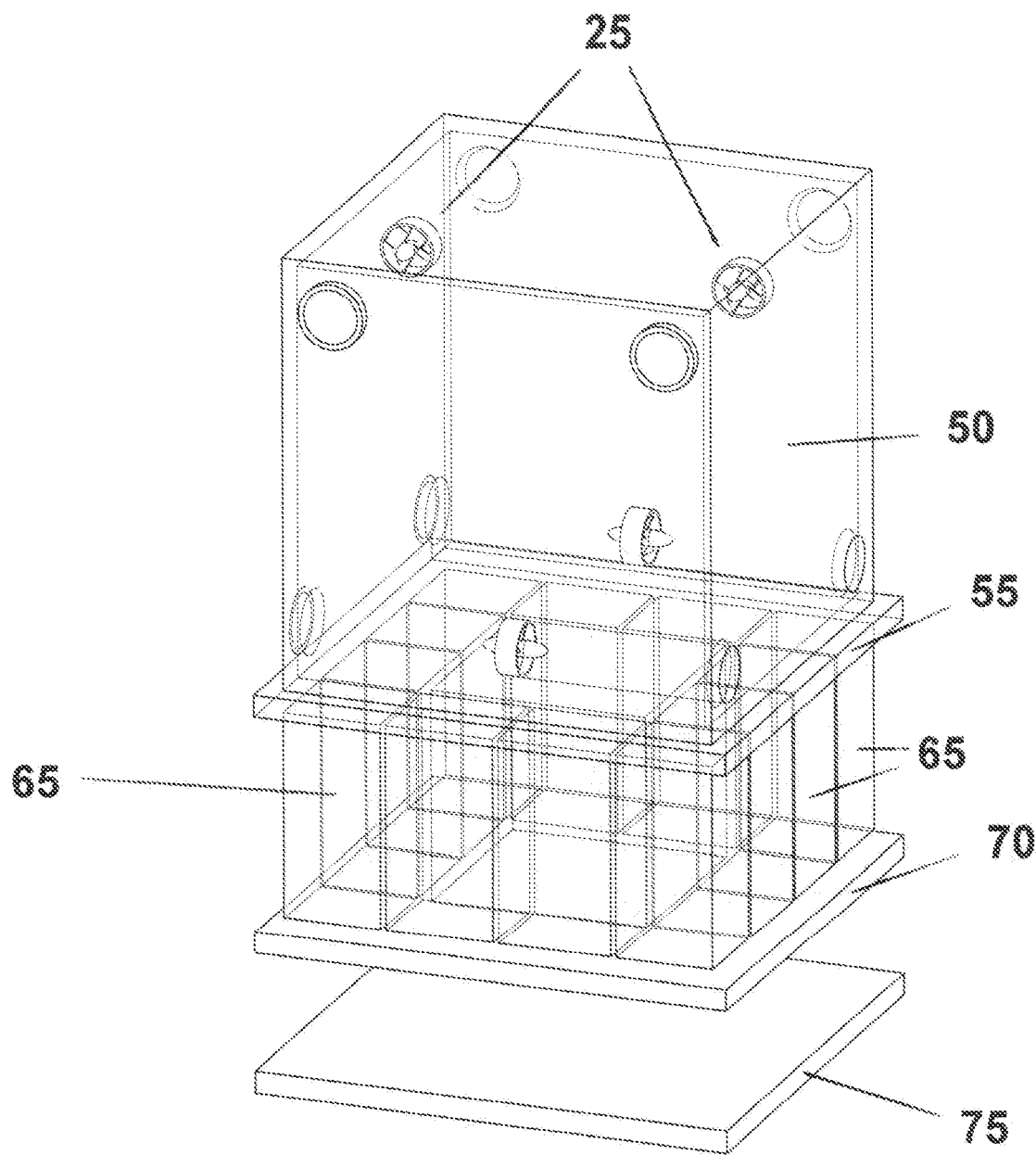
FIG. 4 is unexploded perspective view of an individual lifting module.

FIG. 4 is an assembled view of the lift module 30. Included in this view is the static tank 50 which sits on top of the static deck 55. Below the static tank 55 is a dynamic tank 60 surround by a series of trim tanks 65. The trim tanks are used to make fine adjustments in elevation and to compensate for off center loads. The thruster fans 25 that serve to move and position the lift module are also shown. The equipment deck 70 is the platform on which the dynamic tank 60, various trim tanks 65 and associated machinery rest. Finally, the payload deck 75 is mechanically attached to the equipment deck.

FIGS. 3 and 4 show one mode of practicing the invention. There are a multitude of combinations and arrangements of static tanks, trim tanks, thruster fans, payload decks, lift modules, etc, that can make this invention work. The underlying essence of the invention is that vacuums are created in large chambers sufficient to provide the lifting force to move large amounts of cargo long distances with a minimal expenditure of energy.

Figure 5:
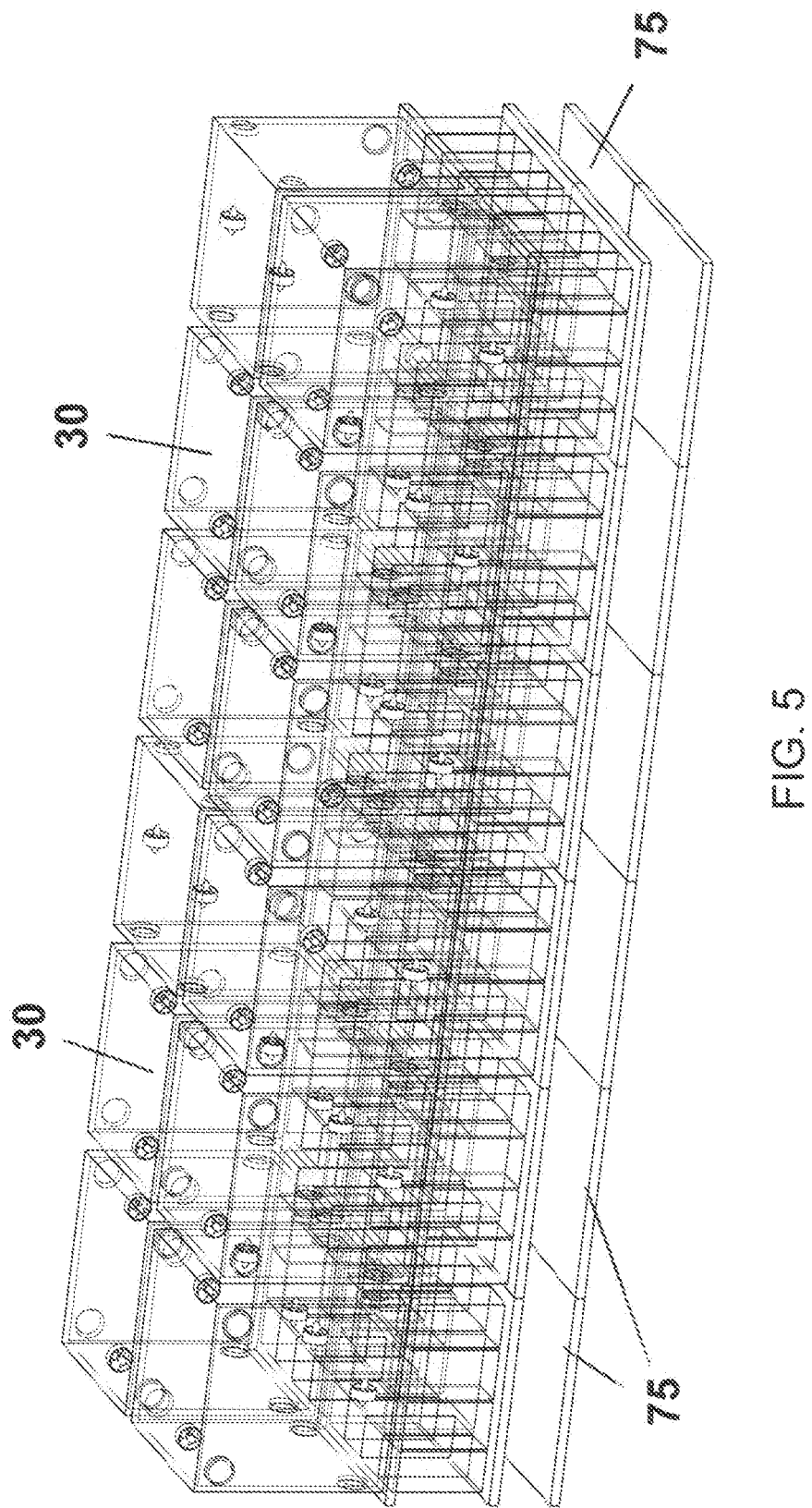
FIG. 5 shows the configuration of the airship with a representative twelve lifting modules.

FIG. 5 is a representative twelve lift module 30 array that would be lifted into the mother ship 15.

Figure 6:
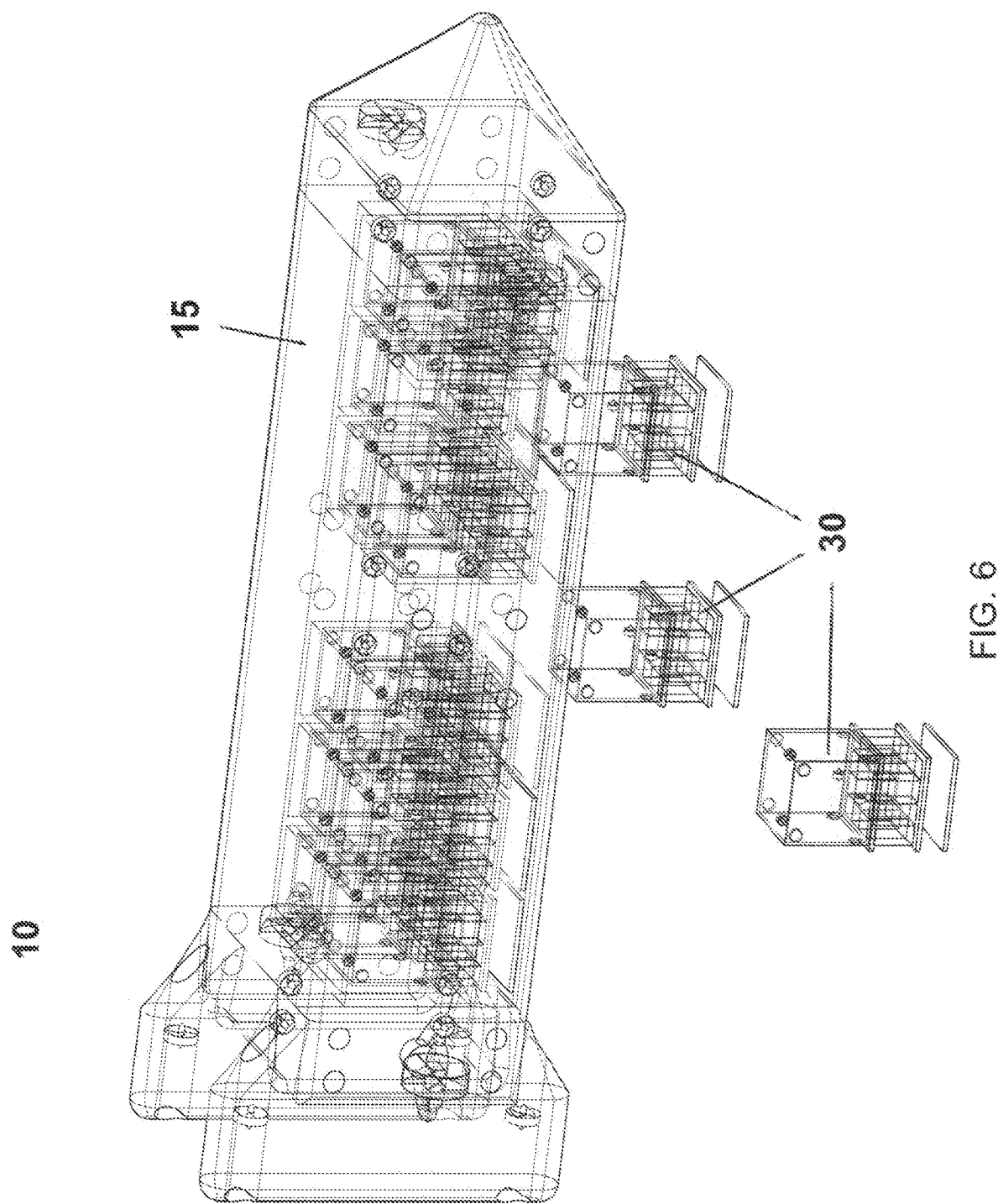
FIG. 6 shows how the individual cargo modules which can be integrated into the Mother ship and landing ships can be used to deliver cargo containers to specific locations.

FIG. 6 shows the manner in which the lift modules 30 can detach from and/or become embedded in the mother ship 15.

Fiber optic network are used all over the ship to transfer outputs from accelerometers, strain gauges, GPS, altimeters, security video feeds, temperature monitors, and of course leak detection. On the roof in addition to the solar panels, there are communication equipment dishes, antenna etc. The structure has an outer cover to prevent personnel from falling. All levels shall be assessable by use of elevators, stairs, walkways and moving walkways. Due to the high altitude that the airship can reach these living quarters will be pressurized and climate controlled to support humans. Areas on the payload deck will be also capable of supporting climate-controlled areas if required.

The static tanks are designed as one or more large fixed size tanks which is sized based on the total weight of the airship without any payload. The static tank is sized to make the airship almost neutrally buoyant at 500 meters below sea-level with all the other chambers (dynamic and trim tanks), fully collapsed (having no vacuum and creating no displacement of the atmosphere). Accordingly, in the unloaded condition the ship will just barely rest on the lowest surface of the earth. The static tank will be internally supported using a truss system and will have baffles to compartmentalize the vacuum chamber such that if a breach were to occur in the tank wall not all vacuum would be lost. This compartment would most likely be at the top of the structure while the payload deck would be at the bottom of the structure just above the ground landing skids. The reason for this arrangement is to provide stability so the airship will always maintain a vertical arrangement. Other arrangements are possible depending on design requirements.

The control and living quarters are located between the static and dynamic tank levels so that there is separation between the living quarters and the equipment deck. This allows a buffer from the noisy equipment deck. All equipment can be monitored remotely with video sound etc. over the internal fiber network. The living quarters will also house all facilities to keep feed and house the staff and guests. Storage tanks for waste along with other liquids will most likely be located at the bottom of the ship.

The dynamic tank is designed to change volume by expanding vertically downward. Having the dynamic tank expand downwards allows a minimization of the forces required to generate the pulling forces to overcome the contraction pressure of the external air pressure trying to contract the structure. The gravitation weight of the structure if properly designed could be designed to where the forces of the external air pressure balance (are equal and opposite) the gravitational weight of the moving components of the dynamic tank structure weight so the amount of energy to expand and contract the dynamic and trim tanks would be minimized. Additionally, each expansion area would be separated from the other dynamic tanks to prevent a seal loss in one chamber from impacting the other dynamic tanks.

The trim chambers are smaller dynamic tanks located around the larger central dynamic chamber. The dynamic and trim chambers are located below the static tank. These trim chambers are used to keep the ship from tilting off horizontal when external loads, wind etc. are applied to the structure. The trim chambers will also be used to offset nonuniform loading of the payload deck.

The dynamic equipment platform is located at the base of the dynamic tank and houses the winches and equipment necessary to increase or decrease the volume of the dynamic tank. Additionally, it will house the equipment for the trim chambers to increase and decrease the trim chamber volumes. All this equipment is accessible on this deck and will have redundancy designed into the system so a failure of one piece of the equipment will not impede the operation of the airship. This deck will also house the power generation equipment used for backup generation. The airship will be a primarily electrically operated ship with electric power generation coming from solar and having fossil generation backup should the sun not shine for extended periods.

Located below the dynamic equipment platform is the payload platform. This platform can be fixed or suspended by cables operated by winches located on the equipment platform. The payload platform can be designed for numerous operations such as holding containers or large cargo, tanks for grain or other raw materials or for equipment. The payload platform could be used as a lifting platform to lift structures too large to be transported by normal means over roads, through locks or across areas that are normally impassable by ground or water-based transportation. The arrangements and designs of the payload platform are virtually limitless.

Located below the payload deck in the structure that holds the payload deck surface is an area that will house all the batteries that will be used to power the airship. Additionally, this structure will house the liquid storage tanks, fuel etc. This will also be an area that would float the airship if it were to set down on the water. This lowest part of the ship would contain storage tanks for water, fuel, liquid waste etc. and house all the batteries to store the energy generated by the solar cells that is not consumed and to store power for use when the sun was not available to generate electricity. If the airship is primarily used as a lifting vehicle the payload deck substructure could be raised up to the base of the dynamic deck with no impact on the operation or stability of the airship.

The dynamic or static chambers are made of welded steel (or similar metallic material) plates. Steel plates are required because metal barriers are much better at minimizing gas migration or leakage. Currently, all plastics or similar materials will allow unacceptable levels of gas or moisture leakage to migrate through them. Metal has proven to be the best method to completely stop the migration of gases through a material wall. Metalized plastic sheeting or other material may be used to cover the vacuum chambers. It is expected that due to the high strength and low cost of steel that the structure and walls of the vacuum chambers will be most likely be constructed of metal plates. Monitoring systems will be incorporated into the designs such that if a leak starts the operator can be notified and actions can be taken. The first line of defense is the monitoring system that can identify where the leaks are located quickly. One potential leak detection system would be to use fiber optic cables connected to the surface of the chambers to listen for the noise of air leaking into the chambers and then the commercially available system could identify where the leak is located, and it can be quickly repaired. Pressure transducers could also be used to indicate leaks into the vacuum chambers. The static chambers are the most critical since they maintain neutral buoyancy of the primary ship. Internal barriers can be designed into the static chamber to ensure if a leak develops the impact on the buoyancy of the ship is not detrimental.

The dynamic chambers can be used via piping and valves to draw gases from the static chambers if there is a leak and to re-establish the vacuum in the static chamber. Barriers will be incorporated into the dynamic chambers so if a leak develops it will not compromise the entire dynamic chamber. If a leak occurs in the dynamic chamber the leak can be isolated to a single chamber and that chamber can be collapsed and another chamber expanded to provide the buoyancy from the chamber that has leaked. When the repair has been completed the chamber can be evacuated using one of the other chambers to evacuate the leaking chamber in the collapsed state and then the chamber can be expanded to re-establish the vacuum in the chamber providing the required buoyancy, There would be redundancy in the number of dynamic tanks and trim tanks.

In the worst case of a total loss of vacuum the ship will sink in the air to the ground. The severity of the leak will determine the rate of descent. The ultimate detail design of the ship should incorporate redundant systems to minimize the risk of the ship sinking. This is similar to the design of ocean-going vessels and aircraft used today that have redundant system and plans to cover every contingency that could impact the airship. Looking at the airplane industry, the safety record is very good, and it is not very often that a plane crashes due to mechanical error. Usually they can be landed without major damage. The same approach will be used for these airships The chambers are created by welded plates of metal connected to internal or external trusses also made of metal such that these plates can withstand the forces exerted by the outside air pressure. These trusses would be connected to a rigid external support frame built to withstand the forces of the weight of the chambers and the other components that would be required by this massive structure. The static chambers would be pumped down to a vacuum by mechanical pumps and sealed. The dynamic chambers are a series of metal bellows that are much like the bellows of an accordion that can expand and contract along a common axis. This dynamic chamber would be attached to the rigid external support frame at the top of the frame and the axis of expansion would be vertically down. The dynamic chamber would start in the collapsed position and would be pumped down to a vacuum and sealed. As the dynamic chamber is expanded, the air surrounding the vacuum chamber would be displaced and replaced by the vacuum. This would create the buoyancy in the atmosphere providing lift to the airship.

The static chambers would provide for near neutral buoyancy in air at sea level when all the dynamic chambers are in the collapsed position. To lift loads the dynamic chambers would be elongated using externally attached winches with cables or other mechanical means to pull the bottom plate of the dynamic chamber down thus increasing the amount of air displaced by the expansion of the dynamic vacuum chamber. The size of the dynamic chamber should be optimally designed such that the weight of the suspended section of the bottom of the dynamic chamber would be offset by the air pressure pushing up on and on the sides of the chamber. Atmospheric pressure of about 14.7 psi at sea level is a significant force to overcome, but the steel structure will not be light so the two sets of forces can be balanced against each other. The real advantage is that the rigid external structure strength requirements do not increase if the volume of the chambers increases because once you reach the strength to resist the air pressure, that force is addressed and the only addition in force is in size of the structure. Also, the bulk of the forces are tension forces instead of compression forces.

The vacuum volume must lift the structure weight and whatever load is being lifted. The volume however can be increased without requiring major energy input to the system. Lift is changed by raising or lowering the bottom plate increasing or decreasing the volume of the vacuum and conversely the volume of displaced air. The novel idea is that unlike normal blimps and other lighter than airships, no gas needs to be added or vented and then replaced. This allows the ship to rise and fall without adding or loosing exotic gases.

The associated equations and sample lifts are provided below:

Force Buoyant=density of air×volume of air×acceleration due to gravity

Force Buoyant=kg–m/sec$^2$=Newtons=1/9.81 kgf=0.10194 kgf=0.224809 lbf

Density of air=kg/m$^3$ approximately 1.2 kg/m3

Volume of displaced air m$^3$

Acceleration due to gravity 9.81 meters/sec$^2$

To lift 1000 MT=1000000 kgf=9810000 Newtons/ (1.2 kg/m3×9.81 m/sec2=833 333 m3

1000 Metric tons is equal to 2 200 000 pounds of weight

Volume of a vacuum required to lift 1000 MT 94.1 m×94.1 m×94.1 m

Which in feet is 309 ft by 309 ft by 309 ft so about a football field cubed

Total lift capacity can be increased by adding more dynamic chambers. Alternatively, lift can be increased by adding lift modules which contain static and dynamic chambers and bolting them together. They also can be stacked on top of each other.

Theory of Operation

The operational basics of the instant invention are as follows. The vacuum volume starts in a collapsed state and from the top platform a bottom platform lowers down. The volume is enclosed and sealed and has an initial small vacuum that was created using a mechanical pump. As the vacuum volume expands the external air is displaced and lift is created. Forces and pressures associated with the volume will be related to the air displaced. Each 100 m$^3$ of volume will have equal forces on opposite sides and will most likely be optimized to take into consideration the weight of the dynamic structure. Assuming air pressure of 20 psi (includes a factor of safety over the standard value of 14.7 psi) and assuming a six-sided box 100 meters on each side the compressive forces would be applied to an area of (100 meters×100 meters)/(0.3048 meter/ft)$^2$ (100/0.3048)$^2$=328×328 ft$^2$=107584 ft2=15,500,031 in$^2$ Multiplying by 20 psi yields a force of 310,000,620 pounds force on each face of the cube. This is all compressive force on an internal structure.

Assuming A36 mild steel the yield strength is 36,000 pounds per square inch, Assuming 50%, that means 1 sq. inch of steel can resist 18,000 pounds of force so to withstand the 100 m$^2$ of air pressure would require 17,223 in$^2$ of steel or 12.0 ft$^2$ of steel area.

While the amount of steel appears to be significant, it is only 17,223/15,500,031=0.112% of the area supported and by the intelligent use of truss design the total structure weight is going to be a small percentage of the volume.

The innovative and novel concept is that by expanding the volume similar to an accordion the lifting force due to displacing air is raised or lowered without the addition of any other gasses or materials. The change is reversible. Also using gravity assist to expand the accordion and pressure assist to contract the accordion reduces the overall energy requirements to control lift. Once an object is lifted to an altitude no additional energy is required to hold it at that altitude. There are air density changes in the atmosphere and that is where the trim chambers would come into play. As the air density changes the trim chambers would be automatically expanded or contracted to offset the air density change.

These structures will be large and expensive but super tankers are not small nor inexpensive. It will basically be a supertanker, freighter, or ultra large crude carrier that floats in air instead of water.

In alternate embodiments of the instant invention, the vacuum lift concept can be employed in airships of a variety of sizes and shapes for a variety of commercial and governmental applications including, but not limited to, billboards, water generators, solar parks, hotels, wind farms, condominiums, homes, farms, fresh water transport, transport for material and people, and mobile rocket launch platform. Another alternate embodiment would be the use of the static tank to support multiple vertical legs that would be anchored to the ground and then floors of a building could be built on being supported by the vertical legs and the static tank which would create very tall structures that are in tension and not in compression allowing for very tall buildings. While configurations, sizes, methods of creating the requisite vacuum, and means of moving the airship will vary, the underlying concept of providing vertical lift by mechanically creating vacuums is the fundamental characteristic of all the above alternate embodiments.

Wind and solar to X or Carbon Harvesting can also be done on the airship device. This would be accomplished by the extraction of carbon from CO2 and hydrogen from water vapor from the air and then by recombining into hydrocarbons. A CO2 extraction filter/catalyst has been developed to extract from flume streams in fossil generation which could installed on the airship and be used to extract CO2 from the atmosphere and use it for industrial purposes. Simple electrolysis can be used to extract hydrogen from water and the result would be oxygen being generated in the atmosphere. The removal of CO2 and the addition of O2 back into the atmosphere could help with global warming as a byproduct.

The description of the expanding chambers can take many forms, the simplest being a cylinder with a sealed piston plate that is free to move along the cylinder axis. The accordion vacuum chamber is more complicated due to the numerous hinges that must be sealed but does offer the advantage of locating some of the support structure internally to the vacuum chamber to counteract the compressive forces of the atmosphere. There are numerous methods to create the vacuum chamber but the principle is the same in that the internal volume of the chamber must be sealed against allowing air or gas to migrate into the vacuum chamber and a design that minimizes the forces and work required to expand and contract the chamber taking advantage of the gravity forces and the atmospheric air pressures.

Horizontal Propulsion of the Ship

The air ship in all of its possible configurations must have a means to move horizontally against external forces caused by wind and weather. For long distance moving, the ship will ride the jet stream and other global air currents to move with little or no power being expended. When maneuvering is required is it envisioned that the vessel would have multiple large electric motors driving variable pitch props creating forces in the air to move the ship in the desired direction. These large most likely ducted fans will be able to rotate and pivot allowing the ship to be steered in the wind. The motors will most likely be electric motors operating at medium voltage and connect by an electrical network of power cables to supply the power from either batteries or from some form of electric power generation.

The ship will incorporate solar panels on its outer surface to generate electric power which will be stored in batteries located on the ship. This will allow for the ship to operate almost indefinitely without having to land and take on fuel. Additionally, the vessel will not add greenhouse gases to the atmosphere because its primary energy source is the sun. At night the battery bank would supply the power required by the ship and there would be an emergency backup generator in case of a power grid failure. The power grid failure would be highly unlikely because the electric network could be designed with sufficient redundancy and loop system that would allow for long term safe operation.

Loading and Unloading of Payload

The ship will most likely be configured in many different purpose-built shapes; much like today's ships currently operating on the waters of the world. There will be small pleasure craft, to medium to large container ships to smaller delivery ships transporting goods and supplies over short distances. Also there will be heavy lift sky cranes to specialty transportation ships. There will be military vessels to special built research vessels to stationary ships acting like buoys in the sky or operating as some special station; perhaps generating electricity, capturing rain fall or harvesting CO2 and other greenhouse gases from the atmosphere to combat global warming. There could even be hotels and cruise ships and ferries. The possibilities are endless but they all would have similar properties and components. For the smaller ships the number of static and dynamic tanks would be few.

For the larger container ships the design would most likely be based on a modular approach where there would be a "mother ship" that would have compartments where smaller landing vessels would park (smaller being a relative term). These smaller landing ships would be self-contained lifting and landing ships that would be able to leave the mother ship and descend to the ground to deliver a load of containers while the mother ship continued along in the jet stream to pass over the next delivery drop. It would also allow for another landing vessel to take the place of the first landing vessel and start its voyage with the mother ship to the next destination and beyond. The mother ship would act as a floating port that would allow for the transfer of containers and cargo from one landing vessel to the other landing vessels allowing for only the containers needing to go to a particular destination to be delivered to that destination. This would increase the efficiency of transporting the goods around the world. The Mother ship would most likely never have to land except for periodic maintenance and refurbishment. (multiple year periods). This would eliminate the necessity of specific ports of call because the landing ships could drop cargo anywhere in the world. This would also minimize the number of trucks required to move the containers from the central ports to the end destination.

The design of the mother ship would only need to be able to lift its own weight considering that the landing vessels would be self-sufficient at lifting and landing payloads. The Mother ship's primary purpose is to provide pathways for the containers to move from one landing vessel to another landing vessel. The mother ship would also provide housing for the workers and provide for temporary repairs of the landing ship if it was required.

The other advantage of the large mother ship is its stability in unsettled weather because of its mass due to all the landing vessels with cargo. As buffeting winds push on the mother ship, the shear mass of the ship would dampen any sudden movements. The smaller landing ships may respond differently due to the smaller mass of the landing vessel.

The landing ships would be modular and would carry the containers on the bottom level of the ship such that it could after lowering itself to the surface of the earth drop the container to its final destination using a built-in crane. The landing vessels will have their own propulsion systems; most likely employing large medium voltage electric motors driving directional fans that can rotate and pivot allowing the landing vessel to steer itself horizontally to and from its final destination in all kinds of weather conditions.

Defense of the Airship.

For commercial vessels the security would be similar to what existing container ships, tanker ships and cruise ships are currently using today with cameras and check points all over the ship all reporting back to redundant central storage of the data and a central command center.

Access to the ship will have to be controlled while on the ground and while in flight due to the large relatively flat surface of the ships top and the open bays from the bottom. If someone wanting to invade the ship would try to board the ship, the locations for boarding would have to be sealed and controlled to provide containment to prevent the intruders from moving very far from where they boarded the ship. Also access from the landing modules to the main or "mother ship" would be through controlled sealable doors that unless the security system allowed access would and could not be opened.

In addition to cameras and IR cameras, acoustic fiber optic monitoring would be deployed to alert the security deck of intruders on the top deck or exterior of the vessel. Also, temperature sensing using fiber optic cables along the surface of the vessel could be used to indicate if a long-range laser attack is occurring. This could be countered by the use of a smoke shield to diffuse the laser beam while the laser source was neutralized.

The first line of defense against an actual boarding of intruders would be the use of high energy dazzler laser weapons such as are currently being developed by the military for crowd control and to disorient and immobilize intruders. The dazzler laser when directed at a human intruder would basically heat their bodies to a high enough temperature that they would become disoriented and distracted and thus their threat would be neutralized. High energy lasers could be pointed at the attacking vessel ship etc. and with the use of targeting systems the intruder's equipment could be damage badly enough that the attack would most likely be aborted. Water cannons could also be employed but the storage of enough water could be problematic. Electrification of the surface or electric fences could also be employed to stop and deter intruders.

Military Defense of the Airship.

This vessel if used as a military vessel would have a landing strip similar to a modern day aircraft carrier (just longer) that could be used to launch and land fighter jet aircraft, helicopter, AIWAC airplanes and other military aircraft to support and protect the outer perimeter and the inner perimeter. The military vessel defense would be very similar to what the US Navy uses for the protection of current aircraft carrier groups.

The protection system would be based on the following protection zones: Outer airborne zone is a perimeter starting at about 190 km from the ship going out to 250 km or more. Inner protection airborne zone starting at about 190 km going inward toward the ship and stopping at the visible close in zone. The visible close in zone is the last line of defense before reaching the ship and is covered by the close in defense system.

The Outer and inner protection zone defense would be handled similar to the current methods that are used by the aircraft carrier groups. The close in zone will have an added level of complexity since the ship will be able to pass over land which even if the ship was operating at the upper reaches of the atmosphere it still would only be 80 km to sea level. It will most likely be operating at a lower level, so to protect the ships underside would most likely be handled by the close in zone in conjunction with armoring.

Depending on where the ship is operating the close in zone would most likely use a system like the Phalanx CIWS currently used by the US Navy. There are also missiles that could be launched to take down incoming threats. These systems would be used to protect the vessel in close range when the laser system could not be used, or the target was too large for the lasers to damage. The detrimental issues are the fact that the bullets from the Phalanx system would eventually fall to the ground and could cause injury and damage to innocent bystanders when over land. Alternatively, a laser based defensive system could be employed.

Being that the ship can operate at the limits of the atmosphere would add another element to the requirements of protection of the current navy solution. That element would be protection from being attacked from low earth orbit. There are numerous missiles system that could pose a threat to the ship. Also, potentially static and or smart bombs could be dropped from low earth orbit.

This ship would have to have armor to protect the perimeter against these types of threats and that would not be difficult considering adding the weight of armor is not going to cause much hardship due to the fact that increasing the size of the static tanks allows it to support more mass (the armor) that is part of the ship.

Fail Safe Configurations

The ship is a relatively slow moving, very large target so it needs to be designed to have a very robust design to withstand multiple failures and components losing vacuum in the static and dynamic chambers. The advantage of the design is that it can support heavy payloads which means it can have multiple levels of redundancy. Multiple layers of armor can be employed to protect against external aggression with the goal of preventing the vessel falling from the sky. It can be designed with multiple static tanks that have internal partitioned chambers. It could easily be designed such that if it were to lose 30 percent or more of its static tanks, it could still remain airborne. This would be accomplished by having additional dynamic tanks (or increasing the size of the dynamic tanks) that are used for redundancy in case of a static tank failure or damage from external attack. Additionally, by used of the dynamic tanks after temporary repairs to the static tank the static tank could be evacuated to again support the vessel in the sky. The static tanks would be connected via piping to the dynamic tanks to accommodate the inflight evacuation of a static tank if that would be required.

Boosting Payloads into Space

In a further embodiment, the vacuum airship could be configured to boost payloads into outer space. One method for boosting payloads into outer pace would be to have a ship anchored to ground with many anchors. A launch pad would be erected on the top of the air ship. The ship would ha any dynamic tanks installed. Once the space vehicle is loaded on the air ship, all the dynamic tanks would be expanded at once to the maximum expansion they have, thereby creating a very large buoyance force. Then all the anchors would be disconnected simultaneously from the ground (most likely using something similar to explosive bolts). The ship would then lift off and begin accelerating vertically upwards taking the space ship to the outer reaches of the atmosphere. Much like letting a cork go from the bottom of a swimming pool, it would pop to the highest part of the atmosphere and then fall down and float on the air as it reached equilibrium. Knowing the acceleration of the ship and the air pressure, the space vehicle would be launched at the optimum point of the airship ascension and eliminate the bulk of the fuel that has to be used to launch a payload into space. The elimination of launch fuel would be significant because the airship accelerated the spaceship while getting it past the bulk of the atmosphere before it started burning the space ship fuel.

Another method would be to have the airship up as high as it can go in the atmosphere but anchored to ground and build a linear motor from ground up to the airship. Then, put the space ship on the linear motor and accelerate it until it reaches maximum speed, then start the rocket motors. Once the material is in space, another air ship could be constructed in earth orbit. Then it could be taken to another planet and land on the surface by collapsing the dynamic tanks.

What is claimed is:

1. An airship that utilizes the creation and maintaining of vacuums to provide lift to elevate the airship off the ground and maintain said airship in position above the ground, said airship comprising:
 a. one or more rigid static chambers;
 b. one or more accordion-like airtight dynamic chamber structures disposed within said rigid static chambers;
 c. said vacuums created by expanding the airtight accordion-like dynamic chambers within the rigid static chambers;
 d. wherein a required lifting force is provided by additional expansion of said dynamic chambers; and
 e. said dynamic chambers measure 600 foot×600 foot× 600 foot.

2. The airship as in claim 1, capable of lifting one or more twenty foot shipping containers for transport.

3. The airship as in claim 1, wherein the airship can remain stationary in a fixed location above the earth for extended periods of time or ride the jetstream to various locations worldwide.

4. The airship as in claim 1, wherein the airship is capable of moving by the use of fossil fueled engines.

5. An airship comprising the following components:
 a. a framework;
 b. one or more accordion-like airtight dynamic chamber structures;
 c. one or more rigid static chambers;
 d. stabilization trim chambers,
 e. a control platform,
 f. a payload deck,
 g. a roof covered in solar panels,
 h. a dynamic equipment deck,
 i. a support structure based on vertical columns to transfer forces from payload to lifting tanks,
 j. maintenance and machinery areas,
 k. a control area and living quarters,
 l. landing skids to support the structure when lift has been eliminated,
 m. bumpers and fenders around all sides to facilitate docking in air with other airships,
 n. wherein the one or more accordion-like airtight dynamic chamber structures are disposed within said rigid static chambers,
 o. vacuums are created by expanding the airtight accordion-like dynamic chambers within the rigid static chambers,
 p. wherein a required lifting force is provided by additional expansion of said dynamic chambers, and
 q. said dynamic chambers measuring 600 foot×600 foot× 600 foot.

6. The airship as in claim 5, wherein the static and dynamic chambers are made of welded steel or similar metal connected to internal or external trusses.

7. The airship as in claim 5, wherein the static and dynamic chambers are made of welded steel or similar metal connected to internal or external trusses and where the welded steel is covered with metalized plastic or another similar material to minimize leakage.

8. A method of elevating and maneuvering a vacuum airship comprising:
 a. creating and maintaining a vacuum in static air tanks such that resulting lift renders an unloaded airship neutrally buoyant at or below sea level with all dynamic and trim chambers fully collapsed;
 b. expanding accordion-like airtight dynamic chamber structures to create a vacuum in said static air tanks thereby creating a lifting force;
 c. lifting standard shipping containers or other payloads into the airship;
 d. moving the airship by a combination of riding a jetstream and using thrusters.

9. A lift module for a vacuum airship comprising the following:
 a. at least one static chamber,
 b. at least one dynamic chamber,
 c. one or more static decks,
 d. one or more trim chambers,
 e. one or more equipment decks,
 f. one or more payload decks,
 g. one or more thruster fans,
 h. wherein the at least one dynamic chamber is disposed within the at least one static chamber,
 i. vacuums are created by expanding the dynamic chamber within the static chamber,
 j. a required lifting force is provided by additional expansion of said dynamic chambers within the static chamber, and
 k. said dynamic chamber measures 600 foot×600 foot× 600 foot.

10. The lift module as in claim 9, wherein the module can be attached to and detached from a mother ship.

* * * * *